United States Patent

Chen

(10) Patent No.: US 8,379,933 B2
(45) Date of Patent: Feb. 19, 2013

(54) METHOD OF DETERMINING SHIFT BETWEEN TWO IMAGES

(75) Inventor: Chi-De Chen, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 360 days.

(21) Appl. No.: 12/830,205

(22) Filed: Jul. 2, 2010

(65) Prior Publication Data

US 2012/0002845 A1    Jan. 5, 2012

(51) Int. Cl.
*G06K 9/00* (2006.01)

(52) U.S. Cl. .................................. 382/107; 348/155

(58) Field of Classification Search .................. None
See application file for complete search history.

(56) References Cited

U.S. PATENT DOCUMENTS

| | | | |
|---|---|---|---|
| 5,903,307 A | 5/1999 | Hwang | |
| 2008/0246848 A1 * | 10/2008 | Tsubaki et al. | 348/208.4 |

FOREIGN PATENT DOCUMENTS

| | | |
|---|---|---|
| JP | 2008109545 | 5/2008 |
| KR | 10-2006-0099351 A | 9/2006 |
| KR | 10-2010-0005544 A | 1/2010 |
| KR | 10-2010-0018336 A | 2/2010 |
| KR | 10-2010-0021216 A | 2/2010 |

OTHER PUBLICATIONS

Ken Sauer and Brian Schwartz, "Efficient Bloch Motion Estimation Using Integral Projections", Oct. 1996, IEEE Transactions on Circuits and Systems for Video Technology, vol. 6., No. 5, pp. 513-518.*
Ratakonda, "Real-time digital video stabilization for multi-media application," Circuits and Systems, Proceedings of the 1998 IEEE International Symposium, May 31, 1998, pp. 69-72, vol. 4.
Kilthau et al., "Full search content independent block matching based on the fast Fourier transform," International Conference on Image Preocessing (ICIP), Sep. 22, 2002, pp. 669-672, vol. 1.
Mei, et al., "Fast Adaptive Block Matching for Ray-Space Coding in FTV System," Acoustics, Speech and Signal Processing 2006, ICASSP 2006 Proceedings, 2006 IEEE International Conference, May 14, 2006, pp. II-473-II-476.

* cited by examiner

*Primary Examiner* — Andrew W Johns
*Assistant Examiner* — Siamak Harandi
(74) *Attorney, Agent, or Firm* — Muncy, Geissler, Olds & Lowe, PLLC

(57) ABSTRACT

A method of determining shift between two images is disclosed. A first array of pixel data of a first image is mapped to a first feature array(s) having a dimension lesser than the first array, and a second array of pixel data of a second image is mapped to a second feature array(s) having a dimension lesser than the second array. The second feature array is aligned with the first feature array by determining similarity between the first feature array and a number of the shifted second feature arrays. The position shift of the shifted second feature array with most similarity is thus determined as the shift between the two images.

20 Claims, 3 Drawing Sheets

METHOD OF DETERMINING SHIFT BETWEEN TWO IMAGES

BACKGROUND OF THE INVENTION

1. Field of the Invention

The present invention generally relates to digital image processing, and more particularly to a method of determining shift between two images.

2. Description of Related Art

Anti-shake function for a camera becomes more indispensable as the number of pixels increases and the camera is equipped with more complex optical schemes, particular in middle-end and high-end cameras.

The anti-shake may be performed using optics, however at a high cost. Alternatively, the anti-shake may be performed using image processing technique to determine the shaking (or shifting) amount. The determined shaking amount may be utilized in a digital camera, for example, to increase the aperture or exposure value (e.g., ISO value). The determined shaking amount may be utilized in a video camera, for example, to counter-shift the frames. However, conventional anti-shake image processing techniques are either calculation-intensive, prone to mis-judgement or prone to noise.

Due to disadvantages of the conventional anti-shake image processing techniques, a need has arisen to propose a novel anti-shake scheme that may perform anti-shake in a more economical manner to reduce manufacturing cost, and in a faster manner to realize a real-time application.

SUMMARY OF THE INVENTION

In view of the foregoing, it is an object of the embodiment of the present invention to provide a method of determining shift between two images in a simple, cost-effective and fast manner.

According to one embodiment, a first array of pixel data of a first image is mapped to at least one first feature array having a dimension lesser than the first array. A second array of pixel data of a second image is mapped to at least one second feature array having a dimension lesser than the second array. The second feature array is aligned with the first feature array by determining similarity between the first feature array and a number of the shifted second feature arrays with a variety of position shifts respectively. Accordingly, the position shift of the shifted second feature array with most similarity is determined as the shift between the two images.

DETAILED DESCRIPTION OF THE INVENTION

Figure 1:
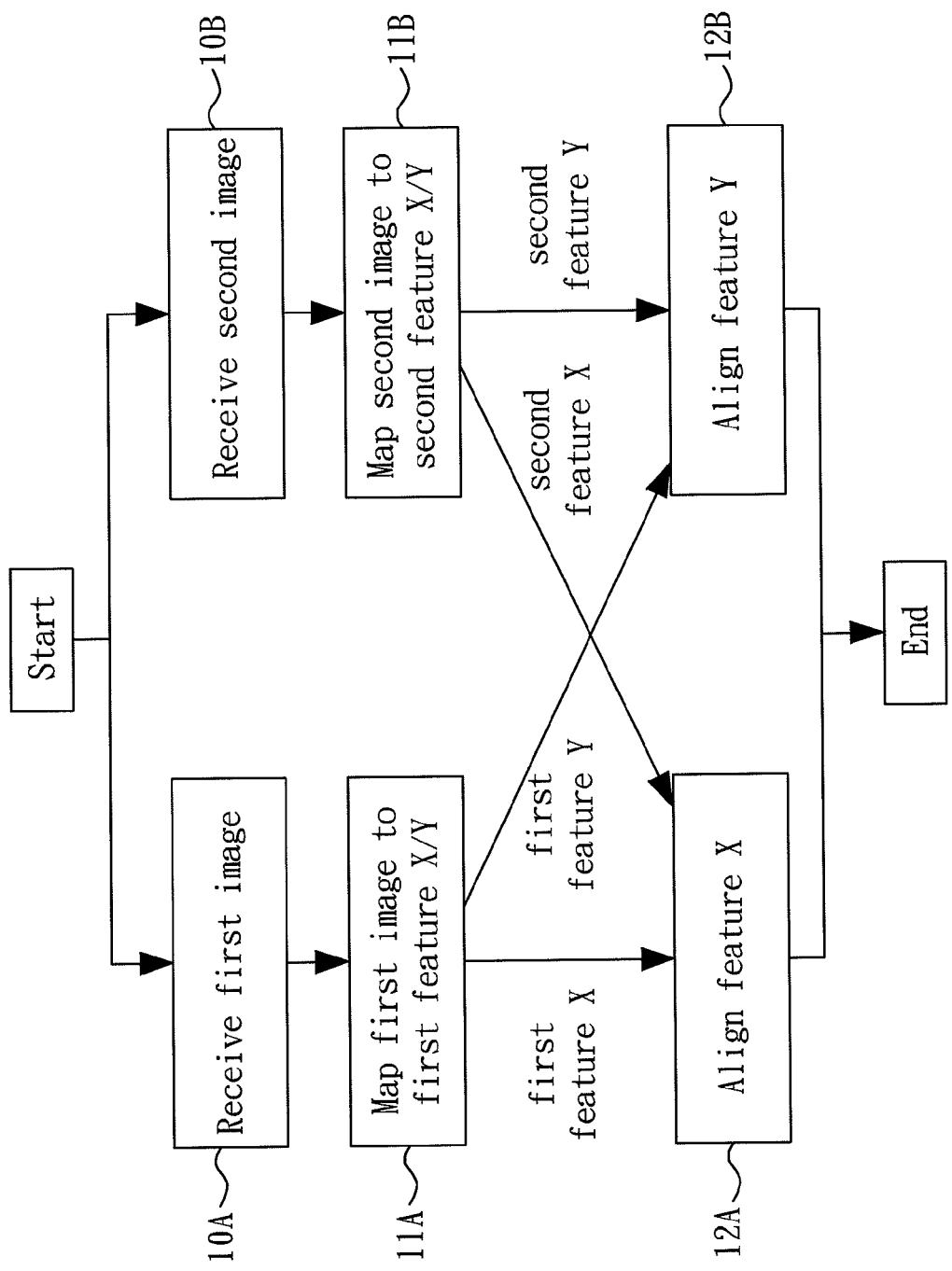
FIG. 1 shows a flow diagram that illustrates a method of determining shift between two images according to one embodiment of the present invention.

FIG. 1 shows a flow diagram that illustrates a method of determining shift between two images according to one embodiment of the present invention. The embodiment may be adaptable to a digital camera, a mobile phone with a digital camera, a video camera or other imaging device. In one example, a photographed picture in the digital camera or the mobile phone with the digital camera may be compensated for shaking according to the determined shift between the two images. In another example, two adjacent frames recorded in the video camera may be compensated for shaking according to the determined shift between the two images.

In steps 10A and 10B, a first image and a second image are received respectively. These two images may be two adjacent frames in a preview mode in the digital camera or the mobile phone with the digital camera, or may be two adjacent frames recorded in the video camera. The first/second image is composed of a first/second array of pixel data. In the embodiment, the first array and the second array are two-dimensional (2D). However, the first array and the second array may have a dimension higher than two.

Subsequently, in steps 11A, the first array of the pixel data of the first image is mapped to a first feature array or arrays having a dimension lesser than the dimension of the first array. In the embodiment, the first array is mapped to a (one-dimensional or 1D) first horizontal feature (or feature X) array and a first vertical feature (or feature Y) array. Similarly, in step 11B, the second array of the pixel data of the second image is mapped to a second feature array or arrays having a dimension lesser than the dimension of the second array. In the embodiment, the second array is mapped to a (1D) second horizontal feature (or feature X) array and a second vertical feature (or feature Y) array. Although a 2D array of pixel data is mapped to two 1D feature arrays in the embodiment, other mappings are possible in another embodiment. For example, a 3D image may be mapped to three 2D feature arrays or mapped to three 1D feature arrays. In another example, a 4D image may be mapped to four 1D feature arrays.

Figure 2:
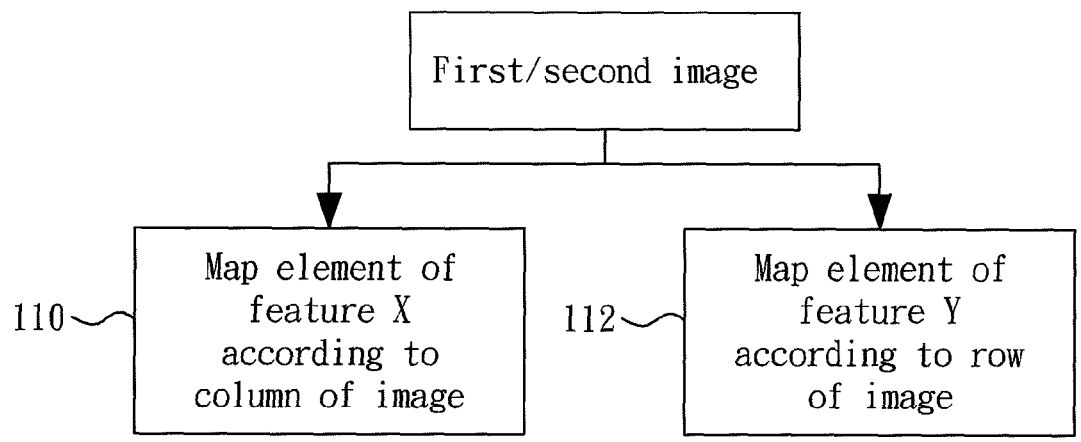
FIG. 2 shows a detailed flow diagram of the mapping step in FIG. 1 according to one embodiment of the present invention.
Figure 3:
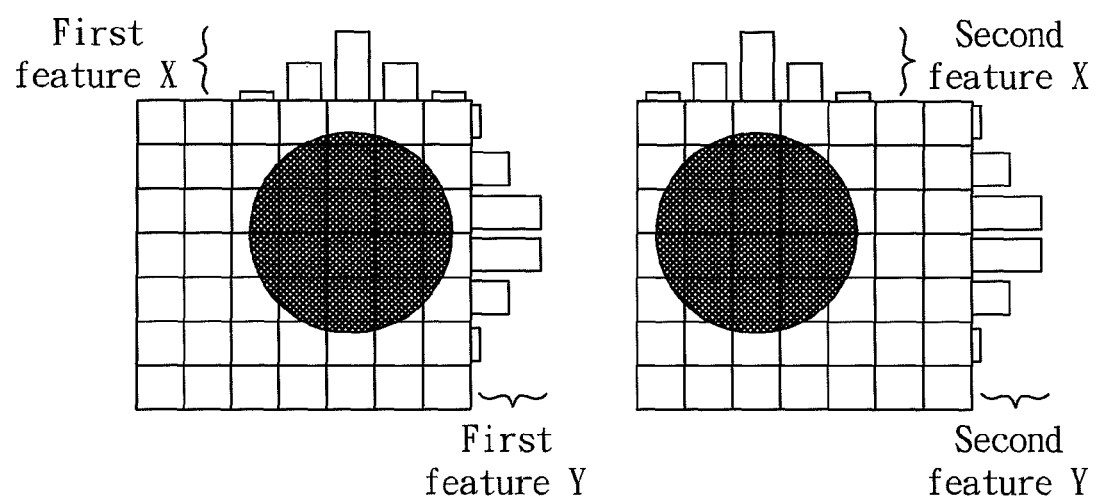
FIG. 3 shows exemplary feature X/Y array represented with a bar chart.

FIG. 2 shows a detailed flow diagram of the mapping step (i.e., step 11A or 11B) in FIG. 1 according to one embodiment of the present invention. Specifically, in step 110, each element of the (1D) first feature X array is mapped according to the corresponding column of the (2D) first array. For example, each element of the feature X array is the sum of the pixel data of the corresponding column. FIG. 3 shows exemplary feature X array represented with a bar chart. In another example, each element of the feature X array is the mathematical product of the pixel data of the corresponding column. Likewise, in step 112, each element of the (1D) first feature Y array is mapped according to the corresponding row of the (2D) first array. For example, each element of the feature Y array is the sum or the mathematical product of the pixel data of the corresponding row as exemplified in FIG. 3. The elements of the second feature X/Y array may be similarly mapped according to step 110/112.

Figure 4:
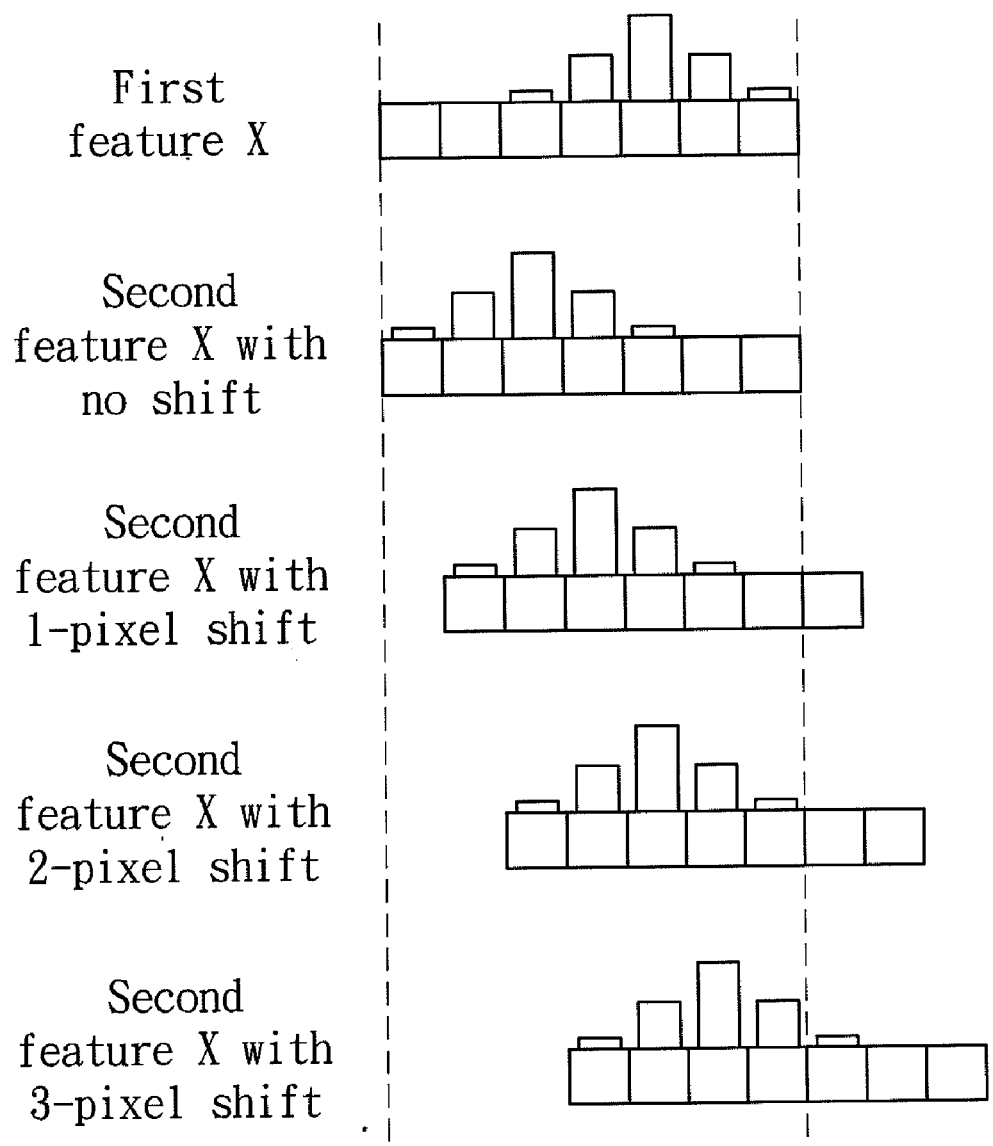
FIG. 4 shows an exemplary first feature X array and some shifted second feature X arrays.

Afterwards, in step 12A (FIG. 1), the (1D) second feature X array is aligned with the first feature X array. In the embodiment, the alignment is performed by determining similarity between the first feature X array and a number of shifted second feature X arrays that have different position shifts respectively. FIG. 4 shows an exemplary first feature X array and some shifted second feature X arrays. In the embodiment, the similarity between the first feature X array and the (non-shifted or shifted) second feature X array is the sum of absolute values of difference values (SAD) between corresponding elements of the first feature X array and the second feature X array. The SAD between the first feature X array (FeatureX1) and the second feature X array (FeatureX2) may be expressed as follows:

$$\sum_{i=1}^{7} \mathrm{abs}(FeatureX1(i) - FeatureX2(i)).$$

In another example, the similarity between the first feature X array and the (non-shifted or shifted) second feature X array is the sum of square values of difference values (SSD) between corresponding elements of the first feature X array and the second feature X array. The SSD between the first feature X array (FeatureX1) and the second feature X array (FeatureX2) may be expressed as follows:

$$\sum_{i=1}^{7} (FeatureX1(i) - FeatureX2(i))^2.$$

Similarly, in step 12B (FIG. 1), the (1D) second feature Y array is aligned with the first feature Y array, for example, by determining similarity (e.g., SAD or SSD) between the first feature Y array and a number of shifted second feature Y arrays.

Accordingly, the position shift of the shift second feature X/Y array with most similarity (e.g., least SAD or SSD value) is determined as the shift between the two images. As shown in FIG. 4, the first feature X array is most similar to the second feature X array with 2-pixel shift, and the SAD or SSD between them thus has the least value.

In another embodiment, not every column is processed to obtain the mapped feature X, or/and not every row is processed to obtain the mapped feature Y, therefore further accelerating the performance. The element corresponding to the non-processed column/row may be obtained by interpolating between its neighboring elements.

In a further embodiment, the shifting range of the second feature X/Y array is not predetermined or fixed, but may rather be dynamically varied. For example, when no SAD or SSD value is distinguishable, the shifting range may then be dynamically increased. In one embodiment, the maximum position shift is determined as the resulting shift between the two images when the SAD or SSD is still greater than a predetermined value.

Although specific embodiments have been illustrated and described, it will be appreciated by those skilled in the art that various modifications may be made without departing from the scope of the present invention, which is intended to be limited solely by the appended claims.

What is claimed is:

1. A method of determining shift between two images, comprising:
    mapping a first array of pixel data of a first image to at least one first feature array having a dimension lesser than the first array;
    mapping a second array of pixel data of a second image to at least one second feature array having a dimension lesser than the second array; and
    aligning the second feature array with the first feature array by determining similarity between the first feature array and a plurality of the shifted second feature arrays with a variety of position shifts respectively;
    wherein the position shift of the shifted second feature array with most similarity is determined as the shift between the two images;
    wherein each element of the first feature array is a sum or a product of the pixel data of corresponding column and/or row of the first array, and each element of the second feature array is a sum or a product of the pixel data of corresponding column and/or row of the second array.

2. The method of claim 1, wherein the first array and the second array are two-dimensional, and the first feature array and the second feature array are one-dimensional.

3. The method of claim 2, wherein said at least one first feature array comprises a first horizontal feature array and a first vertical feature array, and said at least one second feature array comprises a second horizontal feature array and a second vertical feature array.

4. The method of claim 3, wherein each element of the first horizontal feature array is mapped according to the pixel data of corresponding column of the first array, and each element of the first vertical feature array is mapped according to the pixel data of corresponding row of the first array; and wherein each element of the second horizontal feature array is mapped according to the pixel data of corresponding column of the second array, and each element of the second vertical feature array is mapped according to the pixel data of corresponding row of the second array.

5. The method of claim 1, wherein the similarity between the first feature array and the second feature array is a sum of absolute values of difference values between corresponding elements of the first feature array and the second feature array.

6. The method of claim 1, wherein the similarity between the first feature array and the second feature array is a sum of square values of difference values between corresponding elements of the first feature array and the second feature array.

7. The method of claim 1, wherein partial elements of the first feature array are respectively mapped by interpolating between neighboring elements.

8. The method of claim 1, wherein the two images to be determined are two adjacent frames in a preview mode in a digital camera, and a photographed picture in the digital camera is compensated for shaking according to the determined shift between the two images.

9. The method of claim 1, wherein the two images to be determined are two adjacent frames recorded in a video camera, and the frames in the video camera are compensated for shaking according to the determined shift between the two images.

10. The method of claim 1, wherein the shifted second feature arrays are shifted within a predetermined shifting range.

11. The method of claim 1, wherein a maximum position shift is determined as the determined shift between the two images when the most similarity is less than a predetermined value.

12. The method of claim 1, wherein the two images to be determined are two adjacent frames in a preview mode in a mobile phone with a digital camera, and a photographed picture in the mobile phone with the digital camera is compensated for shaking according to the determined shift between the two images.

13. A method of determining shift between two images, comprising:
    mapping a first array of pixel data of a first image to at least one first feature array having a dimension lesser than the first array;
    mapping a second array of pixel data of a second image to at least one second feature array having a dimension lesser than the second array; and
    aligning the second feature array with the first feature array by determining similarity between the first feature array and a plurality of the shifted second feature arrays with a variety of position shifts respectively;

wherein the position shift of the shifted second feature array with most similarity is determined as the shift between the two images;

wherein the similarity between the first feature array and the second feature array is a sum of square values of difference values between corresponding elements of the first feature array and the second feature array.

14. The method of claim 13, wherein each element of the first feature array is a sum or a product of the pixel data of corresponding two-dimensional of the first array, and each element of the second feature array is a sum or a product of the pixel data of corresponding two-dimensional of the second array.

15. The method of claim 13, wherein a maximum position shift is determined as the determined shift between the two images when the most similarity is less than a predetermined value.

16. The method of claim 13, wherein the two images to be determined are two adjacent frames in a preview mode in a mobile phone with a digital camera, and a photographed picture in the mobile phone with the digital camera is compensated for shaking according to the determined shift between the two images.

17. A method of determining shift between two images, comprising:

mapping a first array of pixel data of a first image to at least one first feature array having a dimension lesser than the first array;

mapping a second array of pixel data of a second image to at least one second feature array having a dimension lesser than the second array; and aligning the second feature array with the first feature array by determining similarity between the first feature array and a plurality of the shifted second feature arrays with a variety of position shifts respectively;

wherein the position shift of the shifted second feature array with most similarity is determined as the shift between the two images;

wherein a maximum position shift is determined as the determined shift between the two images when the most similarity is less than a predetermined value.

18. The method of claim 17, wherein each element of the first feature array is a sum or a product of the pixel data of corresponding two-dimensional of the first array, and each element of the second feature array is a sum or a product of the pixel data of corresponding two-dimensional of the second array.

19. The method of claim 17, wherein the similarity between the first feature array and the second feature array is a sum of absolute values of difference values between corresponding elements of the first feature array and the second feature array.

20. The method of claim 17, wherein the two images to be determined are two adjacent frames in a preview mode in a mobile phone with a digital camera, and a photographed picture in the mobile phone with the digital camera is compensated for shaking according to the determined shift between the two images.

* * * * *